United States Patent
Kushihara et al.

(10) Patent No.: US 9,382,421 B2
(45) Date of Patent: Jul. 5, 2016

(54) HEAT-CURABLE RESIN COMPOSITION

(71) Applicant: Shin-Etsu Chemical Co., Ltd., Tokyo (JP)

(72) Inventors: Naoyuki Kushihara, Annaka (JP); Kazuaki Sumita, Annaka (JP)

(73) Assignee: SHIN-ETSU CHEMICAL CO., LTD., Tokyo (JP)

(*) Notice: Subject to any disclaimer, the term of this patent is extended or adjusted under 35 U.S.C. 154(b) by 0 days.

(21) Appl. No.: 14/730,441

(22) Filed: Jun. 4, 2015

(65) Prior Publication Data

US 2015/0353731 A1 Dec. 10, 2015

(30) Foreign Application Priority Data

Jun. 5, 2014 (JP) ................. 2014-116730
Mar. 3, 2015 (JP) ................. 2015-041093

(51) Int. Cl.

| | | |
|---|---|---|
| C08G 75/02 | (2016.01) | |
| C08L 79/00 | (2006.01) | |
| C08K 5/00 | (2006.01) | |
| C08K 5/29 | (2006.01) | |
| C08K 5/3465 | (2006.01) | |
| C08G 73/06 | (2006.01) | |
| C08L 79/04 | (2006.01) | |
| C08G 8/22 | (2006.01) | |
| C08G 73/10 | (2006.01) | |

(52) U.S. Cl.
CPC . *C08L 79/00* (2013.01); *C08G 8/22* (2013.01); *C08G 73/0655* (2013.01); *C08G 73/0661* (2013.01); *C08K 5/0025* (2013.01); *C08K 5/0091* (2013.01); *C08K 5/29* (2013.01); *C08K 5/3465* (2013.01); *C08L 79/04* (2013.01); *C08L 2201/02* (2013.01); *C08L 2203/20* (2013.01)

(58) Field of Classification Search
CPC .............................. C08G 73/22; C08G 65/40
USPC .................................................. 528/210, 219
See application file for complete search history.

(56) References Cited

U.S. PATENT DOCUMENTS

| | | | |
|---|---|---|---|
| 4,368,299 A | 1/1983 | Watanabe et al. | |
| 2009/0117388 A1* | 5/2009 | Nakanishi ............ | B32B 15/08 428/413 |
| 2015/0118509 A1 | 4/2015 | Mizuno et al. | |

FOREIGN PATENT DOCUMENTS

| | | |
|---|---|---|
| JP | 2001-206931 A | 7/2001 |
| JP | 2003-002949 A | 1/2003 |
| JP | 2003-332701 A | 11/2003 |
| JP | 2010-254838 A | 11/2010 |
| WO | 2014/007327 A1 | 1/2014 |

OTHER PUBLICATIONS

Bauer et al., "Networks from dicyanate of bisphenol A and diphenols," Makromol. Chem. Macromol. Symp. (1991), vol. 45, pp. 97-103.
Database WPI, Week 200224, Thomson Scientific, London, GB; AN 2002-181697, XP002745543 (Jul. 31, 2001).
Extended European Search Report issued Oct. 19, 2015, in European Patent Application No. 15170468.1.

* cited by examiner

*Primary Examiner* — Terressa Boykin
(74) *Attorney, Agent, or Firm* — Birch, Stewart, Kolasch & Birch, LLP

(57) ABSTRACT

The present invention can provide a heat-curable resin composition which is excellent in insulation property, heat resistance, and preservation stability. The heat-curable resin composition includes (A) cyanate ester compound having at least two cyanate groups in a molecule, (B) phenol curing agent including a resorcinol type phenol resin represented by the formula (1),

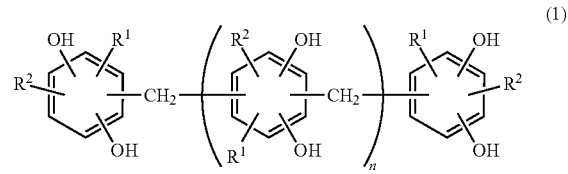

(1)

(In the formula, n represents an integer from 0 to 10, each of $R^1$ and $R^2$ independently represents a monovalent group selected from a hydrogen atom, an alkyl group having 1 to 10 carbon atoms, an allyl group, and a vinyl group.), and (C) at least one compound selected from a tetraphenylborate of a tetra-substituted phosphonium compound and a tetraphenylborate represented by the formula (2).

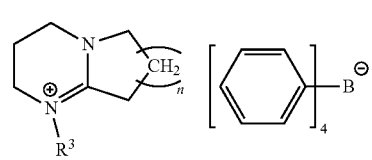

(2)

(In the formula, $R^3$ represents a hydrogen atom, an alkyl group having 1 to 6 carbon atoms, or a phenyl group, and n represents an integer from 1 to 3).

4 Claims, 1 Drawing Sheet

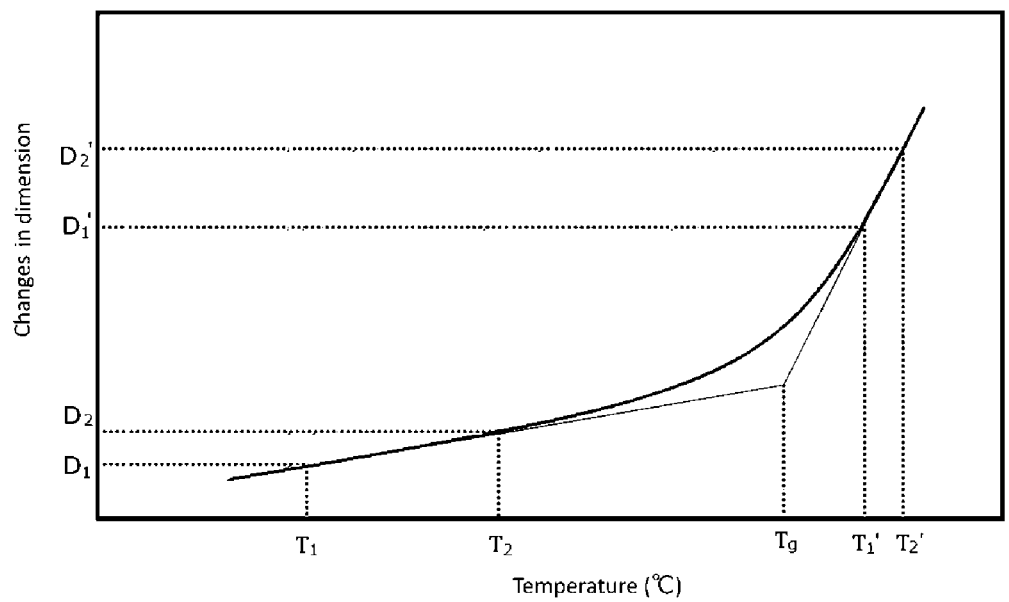

HEAT-CURABLE RESIN COMPOSITION

TECHNICAL FIELD

The present invention relates to a heat-curable resin composition. More particularly, the present invention is excellent in electrical insulation, heat resistance, and preservation stability.

BACKGROUND ART

Recently, by addressing global environmental issues such as a global warming issue and a global energy issue, a hybrid vehicle and an electric vehicle have become popular in an automotive field, and a number of home electrical appliances having an inverter motor drive are increased due to an energy-saving solution. In the fields of hybrid vehicle, electric vehicle, and inverter motor drive, it is important to use a power semiconductor device which converts DC into AC or vice versa, or transforms a voltage.

However, a silicon (Si) used as a power semiconductor device for a long time is about to reach a performance limitation, thereby hardly expecting a dramatic performance improvement. A next-generation power semiconductor device has been therefore focused on that comprises a material such as silicon carbide (SiC), gallium nitride (GaN), and diamond.

SiC and GaN have advantageous properties such that their band gaps are approximately three times larger and their insulation breakdown field strengths are more than ten times larger, compared with the properties of Si. Further, SiC and GaN have other advantageous properties such as high operating temperature (a report exists about SiC operating in 650° C.), high thermal conductivity (SiC is as almost same as Cu), and large saturation electron drift velocity. Due to the properties described above, it is possible to decrease an on-resistance of a power semiconductor device and dramatically reduce power loss of a power converter circuit.

Currently, a power semiconductor device is generally protected by a transfer molding with epoxy resin, a potting sealing with silicone gel, or the like. Particularly, in an automobile field, the transfer molding with epoxy resin is about to become a mainstream in view of reduction in size and weight of a power semiconductor. An epoxy resin is a heat-curable resin, and excellent in moldability, adhesion with base material, and mechanical strength, thereby being a well-balanced material. However, thermodecomposition of a cross-linked point in an epoxy resin progresses in a temperature over 200° C. Therefore, it is possible not to use an epoxy resin as a sealant in a high temperature operation where SiC and GaN are expected to be used.

For achieving this expectation, a cured product of a cyanic acid ester compound has been studied, which has over 200° C. heat resistance. This cured product of a cyanic acid ester compound can be obtained by using a catalyst which accelerates a curing process because a cyanic acid ester compound generally does not progress a heat curing reaction (trimerization reaction) in a low temperature (see, references 1 to 3, for example).

CITATION LIST

Patent Documents

Patent Document 1: JP 2010-254838 A
Patent Document 2: JP 2003-332701 A
Patent Document 3: JP 2003-002949 A

SUMMARY OF INVENTION

Technical Problem

When adding a catalyst in order to enhance a curing speed of a cyanic acid ester compound, the catalyst is generally solved into a solvent to produce a solution, followed by mixing the solution with the cyanic acid ester compound for uniform dispersion of the catalyst in the compound. However, while curing the cyanic acid ester compound, the solvent is volatilized. Thus, there occurs a problem where either the cured product has defects or a long-term heat resistance property of the cured product is impaired due to a low heat resistance of components of the solvent. Further, there occurs another problem where the cured product is not reliable enough to be used as a high-voltage insulating material because an organic metal compound, mainly used as a catalyst for enhancing a heat curing reaction of the cyanic acid ester compound, causes a voltage resistance of the cured product to decrease.

In view of the aforementioned facts, it is an object of the present invention to provide a heat-curable resin composition whose reactivity and preservation stability at low temperature are achieved concurrently, and high glass-transition temperature, low deterioration, and high heat resistance in air at high temperature are also achieved.

Solution to Problem

The present invention provides following compositions.

[1] A heat-curable resin composition comprising:

(A) a cyanate ester compound having at least two cyanate groups in a molecule, (B) a phenol curing agent including a resorcinol type phenol resin represented by the following formula (1)

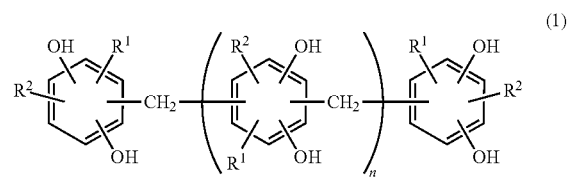

(1)

(In the formula, n represents an integer from 0 to 10, each of $R^1$ and $R^2$ independently represents a hydrogen atom or a monovalent group selected from an alkyl group having 1 to 10 carbon atoms, an allyl group, and a vinyl group.), and (C) at least one compound selected from a tetraphenylborate of a tetra-substituted phosphonium compound and a tetraphenylborate represented by the following formula (2)

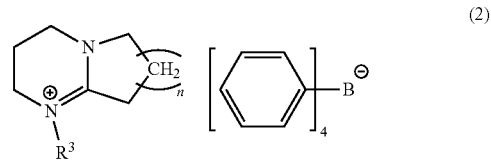

(2)

(In the formula, $R^3$ represents a hydrogen atom, an alkyl group having 1 to 6 carbon atoms, or a phenyl group, and n represents an integer from 1 to 3.)

[2] The heat-curable resin composition according to [1], wherein an amount of the phenol curing agent (B) is an amount at which cyanate groups in the cyanate ester compound (A) are in an amount of 1 to 100 equivalents with respect to an amount of a hydroxyl group (OH group) in the resorcinol type phenol resin represented by the formula (1).
[3] The heat-curable resin composition according to [1] or [2], wherein the cyanate ester compound (A) is in the liquid form at 80° C.
[4] The heat-curable resin composition according to any one of [1] to [3], wherein the component (C) includes a tetraphenylborate of 1,8-diazabicyclo[5.4.0]undec-7-ene derivative represented by the following formula (3), and a tetraphenylborate of 1,5-diazabicyclo[4.3.0]non-5-ene derivative represented by the following formula (4)

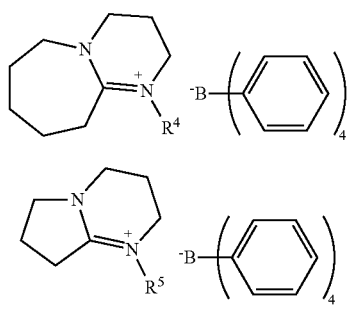

(In the formulas, $R^4$ and $R^5$ represent a hydrogen atom or a monovalent group selected from a saturated hydrocarbon group having 1 to 30 carbon atoms, and an unsaturated hydrocarbon group having 2 to 30 carbon atoms.)

Advantageous Effects of Invention

According to the present invention, there can be provided a heat-curable resin composition which can progress a curing reaction of cyanic acid ester compound (cyanate ester compound) without an organometallic compound catalyst and its solution; whose glass transition temperature is not less than 200° C.; whose deterioration can be hardly observed in air at high temperature; and whose preservation stability is high.

BRIEF DESCRIPTION OF THE DRAWINGS

FIG. 1 shows a method for determination of glass transition temperature.

DESCRIPTION OF EMBODIMENTS

The present invention is described in detail below.
[(A): Cyanate Ester Compound]
Component (A) is a main component of all components used in the present invention and is a cyanate ester compound having at least two cyanate groups. As such cyanate ester compound having at least two cyanate groups, there can be used those known publicly. Examples of such cyanate ester compound having at least two cyanate groups include bis(4-cyanatophenyl)methane, bis(3-methyl-4-cyanatophenyl)methane, bis(3-ethyl-4-cyanatophenyl)methane, bis(3,5-dimethyl-4-cyanatophenyl)methane, 1,1-bis(4-cyanatophenyl)ethane, 2,2-bis(4-cyanatophenyl)propane, 2,2-bis(4-cyanatophenyl)-1,1,1,3,3,3-hexafluoropropane, di(4-cyanatophenyl)thioether, 1,3-dicyanatobenzene, 1,4-dicyanatobenzene, 2-tert-butyl-1,4-dicyanatobenzene, 2,4-dimethyl-1,3-dicyanatobenzene, 2,5-di-tert-butyl-1,4-dicyanatobenzene, tetramethyl-1,4-dicyanatobenzene, 1,3,5-tricyanatobenzene, 2,2'-dicyanatobiphenyl, 4,4'-dicyanatobiphenyl, 3,3',5,5'-tetramethyl-4,4'-dicyanatobiphenyl, 1,3-dicyanatonaphthalene, 1,4-dicyanatonaphthalene, 1,5-dicyanatonaphthalene, 1,6-dicyanatonaphthalene, 1,8-dicyanatonaphthalene, 2,6-dicyanatonaphthalene, 2,7-dicyanatonaphthalene, 1,3,6-tricyanatonaphthalene, 1,1,1-tris(4-cyanatophenyl)ethane, bis(4-cyanatophenyl)ether; 4,4'-(1,3-phenylenediisopropylidene)diphenylcyanate, bis(4-cyanatophenyl)thioether, bis(4-cyanatophenyl)sulfone, tris(4-cyanatophenyl)phosphine, phenol novolak type cyanate, cresol novolak type cyanate, and dicyclopentadiene novolak type cyanate. Not only one kind, but two or more kinds of cyanate ester compounds described above may also be used in combination.

In particular, cyanate ester compounds which are in liquid form at 80° C. are preferred due to easy operation of handling a composition during the preparation thereof or after the preparation thereof. Examples of such cyanate ester compound include bis(4-cyanatophenyl)methane, bis(3-methyl-4-cyanatophenyl)methane, 1,1-bis(4-cyanatophenyl)ethane, and phenol novolak type cyanate ester. 1,1-bis(4-cyanatophenyl)ethane and phenol novolak type cyanate ester are particularly preferred.

The component (A) can be used in an amount of 3.0 to 98 mass % of a whole amount composition, preferably 3.5 to 98 mass %, more preferably 4.0 to 97 mass %. When such added amount of the component (A) is less than 3.0 mass %, there is a problem that a property such as heat-resistance is not developed. When such added amount of the component (A) is greater than 98 mass %, insufficient curing of the composition occurs.

[(B): Phenol Curing Agent]

Phenol curing agent (B) contains a resorcinol type phenol resin represented by the following formula (1). It is preferred that n of the formula (1) is from 0 to 10 in view of melt liquidity. In the case that n is greater than 10, liquidity of such resin composition becomes lower because the resin composition is insoluble at a temperature of not more than 100° C. Two or more kinds of the resorcinol type phenol resins respectively having different values of n may be used in combination. The resorcinol type phenol resins having distributed values of n may also be used. In the formula (1), it is preferred that $R^1$ and $R^2$ represent a monovalent group selected from a hydrogen atom, an alkyl group having 1 to 10 carbon atoms, an allyl group, and a vinyl group. It is particularly preferred that $R^1$ and $R^2$ represent a monovalent group selected from a hydrogen atom, an alkyl group having 1 to 4 carbon atoms, an allyl group, and a vinyl group. Further, $R^1$ and $R^2$ may be groups different from each other. When using a group having more than 10 carbon atoms, the composition cannot obtain enough heat resistance in the case that the group is an aliphatic group, and the melting viscosity (liquidity) of the composition becomes lower in the case that the group is an aryl group.

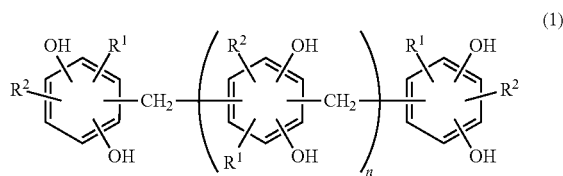

(1)

(In the formula, n represents an integer from 0 to 10, each of $R^1$ and $R^2$ independently represents a monovalent group selected from a hydrogen atom, an alkyl group having 1 to 10 carbon atoms, an allyl group, and a vinyl group.)

The phenol curing agent (B) can be used in the amount where cyanate groups (CN group) in (A) cyanate ester compound having not less than two cyanate groups (CN group) are in an equivalent amount of 1 to 100, preferably 1 to 50, more preferably 5 to 40 with respect to 1 equivalent amount of a hydroxyl group (OH group) in the resorcinol type phenol resin represented by the formula (1). When exceeding 100 equivalent weight of a cyanate group in (A) cyanate ester compound, it is not preferred because the resin composition cannot be sufficiently cured. When being less than 1 equivalent weight thereof, it is not preferred because the heat resistance of the cyanate ester compound itself may be impaired.

Since the phenol curing agent (B) contains the resorcinol type phenol resin represented by the above formula (1), the melting resin viscosity of the phenol curing agent (B) can be decreased, and the curing reaction of the cyanate ester compound (A) can be facilitated. Furthermore, a cured product having an excellent heat resistance can be obtained due to an excellent heat resistance of the resorcinol type phenol resin itself.

[(C): Curing Accelerator]

A curing accelerator (C) includes at least one compound selected from a tetraphenylborate of a tetra-substituted phosphonium compound and a tetraphenylborate represented by following formula (2)

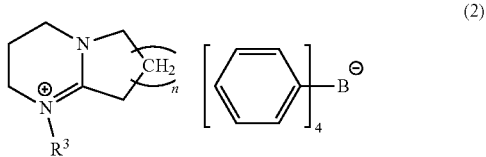

(2)

(In the formula, $R^3$ represents a hydrogen atom, an alkyl group having 1 to 6 carbon atoms, or a phenyl group, and n represents an integer from 1 to 3.) Also, the curing accelerator (C) may include an amine-based curing accelerator.

In the compounds above, examples of a tetraphenylborate of 1,8-diazabicyclo[5.4.0]undec-7-ene derivative include the compounds represented by following formula (3).

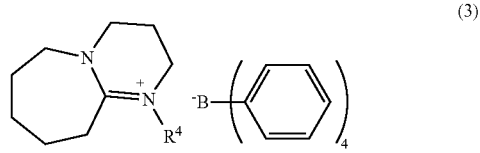

(3)

In the formula (3), $R^4$ represents a monovalent group selected from a hydrogen atom, a saturated hydrocarbon group having 1 to 30 carbon atoms, preferably 1 to 20 carbon atoms, or an unsaturated hydrocarbon group having 2 to 30 carbon atoms, preferably 2 to 20 carbon atoms. Examples of $R^4$ include a linear saturated hydrocarbon group such as a methyl group, an ethyl group, an n-propyl group, an n-butyl group, an n-pentyl group, and n-hexyl group; a branched saturated hydrocarbon group such as an isopropyl group, an isobutyl group, a t-butyl group, an isopentyl group, and a neopentyl group; a cyclic saturated hydrocarbon group such as a cyclopentyl group, a cyclohexyl group, and a cycloheptyl group; a linear unsaturated hydrocarbon group such as a vinyl group, an allyl group, and a 1-butenyl group; an aromatic hydrocarbon group such as a phenyl group, a tolyl group, a benzyl group, and a naphthyl group. A vinyl group and an allyl group are preferable.

In the compounds above, examples of a tetraphenylborate of 1,5-diazabicyclo[4.3.0]non-5-ene derivative include the compounds represented by following formula (4).

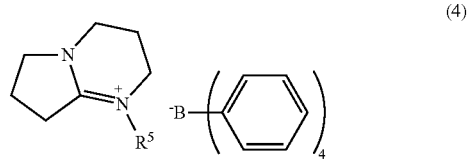

(4)

In the formula (4), $R^5$ represents a monovalent group selected from a hydrogen atom, a saturated hydrocarbon group having 1 to 30 carbon atoms, preferably 1 to 20 carbon atoms, or an unsaturated hydrocarbon group having 2 to 30 carbon atoms, preferably 2 to 20 carbon atoms. Examples of $R^5$ include groups described as the examples of $R^4$. For example, a methyl group, an ethyl group, a phenyl group, and a benzyl group are preferable.

Examples of the compounds above include tetraphenylphosphonium tetraphenylborate, 8-benzyl-1,8-diazabicyclo[5.4.0]undec-7-enium tetraphenylborate, 1,8-diazabicyclo[5.4.0]undec-7-ene tetraphenylborate, and 1,5-diazabicyclo[4.3.0]-non-5-ene tetraphenylborate.

Examples of amine-based curing accelerators include an aromatic amine-based curing accelerator such as 3,3'-diethyl-4,4'-diaminodiphenylmethane, 3,3',5,5'-tetramethyl-4,4'-diaminodiphenylmethane, 3,3',5,5'-tetraethyl-4,4'-diaminodiphenylmethane, 2,4-diaminotoluene, 1,4-phenylenediamine, 1,3-phenylenediamine, diethyltoluenediamine, 3,4-diaminodiphenylether, 3,3'-diaminodiphenylmethane, 3,4'-diaminodiphenylmethane, 4,4'-diaminodiphenylmethane, 3,3'-diaminobenzidine, orthotolidine, 3,3'-dimethyl-4,4'-diaminodiphenylmethane, 2,6-diaminotoluene, 1,8-diaminonaphthalene; an chain aliphatic polyamine such as N,N'-bis(3-aminopropyl)ethylenediamine, 3,3'-diaminodipropylamine, 1,8-diaminooctane, 1,10-diaminodecane, diethylenetriamine, triethylenetetramine, and tetraethylenepentamine; a cycloaliphatic polyamine such as 1,4-bis(3-aminopropyl)piperazine, N-(2-aminoethyl)piperazine, N-(2-aminoethyl)morpholine, N-aminoethylpiperazine, and isophoronediamine; polyamidoamine; imidazole-based curing accelerator; and guanidine-based curing accelerator. The aforementioned polyamidoamine is produced by the condensation of a dimer acid and a polyamine. Examples of the polyamidoamines include adipicdihydrazide and 7,11-octadecadiene-1,18-dicarbohydrazide. Examples of the aforementioned imidazole-based curing accelerator include 2-methylimidazole, 2-ethyl-4-methylimidazole, and 1,3-bis(hydrazinocarboethyl)-5-isopropylhydatoin. Examples of the aforementioned guanidine-based curing accelerator include an aliphatic amine such as 1,3-diphenylguanidine and 1,3-o-triguanidine. Particularly, tertiary amine, tertiary amine salt, or imidazole-based curing accelerator is preferable.

Added amount of the component (C) is from 0.1 to 5 parts by mass to 100 parts by mass of the total amount of the component (A) and the component (B), preferably 0.2 to 1.0 parts by mass. Further, the component (C) may be used by mixing a phenol curing agent or an inorganic filler described later in advance.

[(D): Other Additive Agents]

The heat-resistance resin composition of the present invention can be obtained by mixing appropriate amounts of the aforementioned components (A) to (C). Furthermore, the other additive agents may be added therein without deteriorating the purpose and the effect of the present invention when needed. Examples of such additive agents include an inorganic filler, a release agent, a flame retardant, an ion-trapping agent, an antioxidant, a tackifier, a low stress agent, and a coloring agent.

The aforementioned inorganic filler is added in order to decrease thermal expansion rate of the resin composition or increase moisture proof reliability of the resin composition. Examples of the inorganic fillers include silica such as a molten silica, a crystalline silica, and a cristobalite; an alumina, a silicon nitride, an aluminum nitride, a boron nitride, a titanium oxide, a glass fiber, and a magnesium oxide. An average diameter or shape of these inorganic fillers can be selected as usage.

The aforementioned release agent is added in order to increase mold-releasability of the resin composition. Examples of the release agents include whole known compounds such as carnauba wax, rice bran wax, candelilla wax, polyethylene, oxidized polyethylene, polypropylene, montanoic acid, stearic acid, stearic acid ester, stearic acid amide, and montan wax which is an ester compound made by combining montanoic acid with saturated alcohol, 2-(2-hydroxyethylamino)ethanol, ethylene glycol or glycerin.

The aforementioned flame retardant is added in order to provide flame retardation. The aforementioned flame retardant is not limited, and whole known flame retardants can be used. Examples of such flame retardants include a phosphazene compound, a silicone compound, a zinc molybdate on talc, a zinc molybdate on zinc oxide, an aluminum hydroxide, a magnesium hydroxide, and a molybdenum oxide.

The aforementioned ion-trapping agent is added in order to trap ion impurities in the resin composition and to prevent the resin composition from heat deterioration and moisture-absorption deterioration. The aforementioned ion-trapping agent is not limited, and whole known ion-trapping agents can be used. Examples of such ion-trapping agents include hydrotalcite, bismuth hydroxide compound, and rare-earth oxide. Added amount of the aforementioned additive agents depends on a purpose of the composition, but is generally not more than 98 mass % to the amount of whole composition.

[Preparation Method of Mixture]

The heat-resistance resin composition of the present invention can be produced by the following method. For example, the cyanate ester compound (A) and the phenol curing agent (B) are mixed while performing heat treatment at the same time or separately when needed, thereby allowing the mixture to be stirred, dissolved, and/or dispersed, thus obtaining the mixture of the components (A) and (B). It is preferred that the curing accelerator (C) is added into the mixture of the components (A) and (B), and the mixture is stirred, dissolved, and/or dispersed, thus obtaining the mixture of the components (A) to (C). Further, depending on the purpose of usage of the present invention, the mixture of the components (A) and (B) or the mixture of the components (A) to (C) may contain at least one kind of additive agents such as inorganic filler, release agent, flame retardant, and ion-trapping agent. Each component may be used alone or in various combinations (or two or more kinds of them can be used together).

In the preparation method of mixture, mixing, stirring, and dispersing apparatus are not limited. Examples of such apparatus that can be used include a grinding and mixing machine having a stirring device and a heating device, a double roll mill, a triple roll mill, a ball mill, a planetary mixer, or a mass-colloider. These examples may be appropriately used in combination.

EXAMPLES

The present invention is described below in detail using working examples and comparative examples. The following working examples do not limit the present invention. The working examples 1 to 23 and the comparative examples 1 to 14 of resin compositions for semiconductor sealing were obtained by mixing components shown in Tables 1 to 3 in the amount represented by the same, followed by kneading and mixing the components with a triple roll mill according to the preparation method of mixture described above. After that, the resin compositions for semiconductor sealing thus obtained were heated at 150° C. for two hours and at 200° C. for four hours, the cured products of each working example and comparative example were thus obtained. In addition, the details of materials used in working examples and comparative examples are as follows, and the amount unit in Table 1 indicates parts by mass.

[(A): Cyanate Ester Compound]

(A1) Bis-E type cyanate ester compound represented by formula (5) below (LECy: Lonza Japan Ltd) (Melting point: 29° C.)

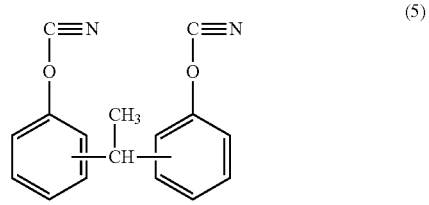

(5)

(A2) Novolak-type cyanate ester compound represented by formula (6) below (PT-15: Lonza Japan, Ltd.) (Melting point: 13° C.)

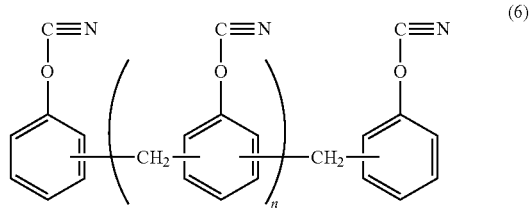

(6)

[(B): Phenol Curing Agent]

In (B1) to (B5), a resorcinol type phenol resin represented by formula (1) was used. In (B6), an allylphenol novolak resin was used as a component (B) for a comparative example.

(B1) resorcinol type phenol resin (MEH-8400: MEIWA PLASTIC INDUSTRIES, Ltd.): n=0 to 4, $R^1$ and $R^2$ represent allyl group, and weight-average molecular weight 450 to 600.

(B2) resorcinol type phenol resin: n=5 to 7, $R^1$ and $R^2$ represent allyl group, and weight-average molecular weight 800 to 1,100.

(B3) resorcinol type phenol resin: n=8 to 10, $R^1$ and $R^2$ represent allyl group, and weight-average molecular weight 1,200 to 1,500.

(B4) resorcinol type phenol resin: n=0 to 4, $R^1$ and $R^2$ represent n-propyl group, and weight-average molecular weight 450 to 600.

(B5) resorcinol type phenol resin: n=0 to 4, $R^1$ and $R^2$ represent vinyl group, and weight-average molecular weight 450 to 600.

(B6) allylphenol novolak resin (MEH-8000H: Meiwa Plastic Industries, Ltd.)

[(C): Curing Accelerator]

(C1) tetraphenylphosphonium tetraphenylborate (TPP-K: Hokko Chemical Industry Co., Ltd.)

(C2) tetraphenylphosphonium tetra-p-tolylborate (TPP-MK: Hokko Chemical Industry Co., Ltd.)

(C3) 8-benzyl-1,8-diazabicyclo[5.4.0]undec-7-ene tetraphenylborate (U-CAT 5002: San-Apro, Ltd.)

(C4) 1H-pyrrolo[1,2-a]pyrimidine-5-ium, 1-benzoyl-2,3,4,6,7,8-hexahydro tetraphenylborate (C5) triphenylphosphine (TPP: Hokko Chemical Industry Co., Ltd.)

(C6) tetraphenylphosphonium bromide (TPP-PB: Hokko Chemical Industry Co., Ltd.)

(C7) 1,8-diazabycyclo[5.4.0]undec-7-ene (DBU: San-Apro, Ltd.)

(C8) DBU-octhyl acid salt (U-CAT SA 102: San-Apro, Ltd.)

(C9) DBU-phenol novolak resin salt (U-CAT SA 851: San-Apro, Ltd.)

(C10) 2-ethyl-4-methylimidazole (2E4MZ: Shikoku Chemicals Corporation)

(C11) tetrabutylammonium tetraphenylborate (Tokyo Chemical Industry Co., Ltd.)

[Measurement of Glass Transition Temperature]

The cured products of working examples and comparative examples were processed into each test specimen formed in the size of 5×5×15 mm, followed by placing each test specimen on the thermal dilatometer called TMA8140C (Rigaku Corporation). The temperature program was set at 45° C./min and 19.6 mN constant load was set to be applied. After that, changes in dimension of each test specimen were measured from 25° C. to 300° C. The relations between changes in dimension and temperature were plotted. The thus obtained graph about changes in dimension vs temperature was used to determine glass transition temperature of working examples and comparative examples by a method for determination of glass transition temperature described below. The determined glass transition temperatures were shown in Tables 1 to 3.

[Determination of Glass Transition Temperature]

FIG. 1 shows a method for determination of glass transition temperature. In FIG. 1, two arbitrary points on temperature axis were defined as $T_1$ and $T_2$ below an inflection point of the graph where a tangent line of changes in dimension vs temperature curve can be obtained. Also, $T_1'$ and $T_2'$ were defined in the same way above an inflection point where the same tangent line can be obtained. Changes in dimension corresponding to $T_1$ and $T_2$ were respectively defined as $D_1$ and $D_2$, thereby obtaining a line between point $(T_1, D_1)$ and point $(T_2, D_2)$. In the same way, changes in dimension corresponding to $T_1'$ and $T_2'$ were respectively defined as $D_1'$ and $D_2'$, thereby obtaining a line between point $(T_1', Dr)$ and point $(T_2', D_2')$. Finally, glass transition temperature $(T_g)$ was determined where these two lines are crossed.

[Measurement of Weight Loss]

The cured products of working examples and comparative examples were processed into each test specimen formed in the size of 5×5×15 mm, followed by placing each test specimen on the thermogravimetry unit called Pyris 1 TGA (PerkinElmer Japan Co., Ltd.). The temperature program was set at 5° C./min and the temperature was measured in air from 25° C. to 550° C. where 5% of whole weight of the test specimen was lost (hereinafter referred to as 5%-weight-loss temperature). The 5%-weight-loss temperatures of working examples and comparative examples are shown in Tables 1 to 3.

[Evaluation of Viscosity Increase Rate]

According to JIS Z8803, a viscosity immediately after producing the resin composition of each working example and comparative example (hereinafter referred to as initial viscosity, unit: mPa·s) was measured at 25° C. with an E-type viscometer after two minutes from the placement of the resin composition thereon. Also, a viscosity of each resin composition after being held at 25° C. for 12 hours was measured in the same way as the initial viscosity, followed by calculating a viscosity increase rate (unit: %). Here, the viscosity increase rate can be calculated using the following formula. Results are indicated on Tables 1 to 3.

Viscosity Increase Rate={(viscosity after 12 hours)−(initial viscosity)}/(initial viscosity)×100

[Evaluation of Curing Property]

A curing property was evaluated after pouring the resin composition of each working example and comparative example into a mold whose thickness is 1 mm and keeping the mold at 150° C. in an oven for one hour. After taking out of the oven and cooling down to the room temperature, the evaluation was performed in a manner such that no surface tackiness was defined as good and surface tackiness or uncured product was defined as bad. Results are indicated in Tables 1 to 3.

TABLE 1

| | | Equivalent Weight | Working Example 1 | Working Example 2 | Working Example 3 | Working Example 4 | Working Example 5 | Working Example 6 | Working Example 7 |
|---|---|---|---|---|---|---|---|---|---|
| Component (A) | Cyanate ester compound (A1) | 133 | 95 | 95 | 95 | 95 | 95 | 97 | |
| | (A2) | 119 | | | | | | | 96 |
| Component (B) | Phenol curing agent (B1) | 107 | 5 | | | | | 3 | 5 |
| | (B2) | 132 | | 5 | | | | | |
| | (B3) | 145 | | | 5 | | | | |
| | (B4) | 107 | | | | 5 | | | |
| | (B5) | 107 | | | | | 5 | | |

TABLE 1-continued

|  |  |  |  |  |  |  |  |  |
|---|---|---|---|---|---|---|---|---|
| Comparison (B) Component (C) | (B6) | 141 |  |  |  |  |  |  |
|  | Curing accelerator (C1) |  |  |  |  |  |  |  |
|  | (C2) |  |  |  |  |  |  |  |
|  | (C3) |  | 0.5 | 0.5 | 0.5 | 0.5 | 0.5 | 0.5 | 0.5 |
|  | (C4) |  |  |  |  |  |  |  |
| Comparison (C) | (C5) |  |  |  |  |  |  |  |
|  | (C6) |  |  |  |  |  |  |  |
|  | (C7) |  |  |  |  |  |  |  |
|  | (C8) |  |  |  |  |  |  |  |
|  | (C9) |  |  |  |  |  |  |  |
|  | (C10) |  |  |  |  |  |  |  |
|  | (C11) |  |  |  |  |  |  |  |
|  | Equivalent Weight Ratio (CN group:CH group) |  | 15.3 | 18.9 | 20.7 | 15.3 | 15.3 | 20.0 | 17.1 |
| Measurement values | Glass Transition Temperature Tg (° C.) |  | 220 | 225 | 225 | 210 | 215 | 230 | 280 |
|  | 5% Weight Loss Temperature (° C.) |  | 440 | 445 | 450 | 430 | 430 | 450 | 465 |
|  | Viscosity Increase Rate (%) 25° C./12 hr |  | 110 | 120 | 110 | 110 | 110 | 110 | 120 |
|  | Curing Property (150° C./1 hr) |  | Good | Good | Good | Good | Good | Good | Good |

|  |  | Working Example 8 | Working Example 9 | Comparative Example 1 | Comparative Example 2 | Comparative Example 3 | Comparative Example 4 | Comparative Example 5 |
|---|---|---|---|---|---|---|---|---|
| Component (A) | Cyanate ester compound (A1) |  |  | 95 | 95 | 90 | 80 | 97 |
|  | (A2) | 86 | 70 |  |  |  |  |  |
| Component (B) | Phenol curing agent (B1) | 14 | 30 |  |  |  |  |  |
|  | (B2) |  |  |  |  |  |  |  |
|  | (B3) |  |  |  |  |  |  |  |
|  | (B4) |  |  |  |  |  |  |  |
|  | (B5) |  |  |  |  |  |  |  |
| Comparison (B) Component (C) | (B6) |  |  | 5 | 5 | 10 | 20 | 3 |
|  | Curing accelerator (C1) |  |  |  | 1 |  |  |  |
|  | (C2) |  |  |  |  |  |  |  |
|  | (C3) | 0.5 | 0.5 |  |  | 0.5 | 0.5 | 0.5 |
|  | (C4) |  |  |  |  |  |  |  |
| Comparison (C) | (C5) |  |  |  |  |  |  |  |
|  | (C6) |  |  |  |  |  |  |  |
|  | (C7) |  |  |  |  |  |  |  |
|  | (C8) |  |  |  |  |  |  |  |
|  | (C9) |  |  |  |  | 0.5 |  |  |
|  | (C10) |  |  |  |  |  |  |  |
|  | (C11) |  |  |  |  |  |  |  |
|  | Equivalent Weight Ratio (CN group:CH group) | 6.6 | 2.1 | 20.0 | 20.0 | 3.5 | 4.2 | 34.3 |
| Measurement values | Glass Transition Temperature Tg (° C.) | 250 | 250 | 190 | 180 | 130 | 170 | Uncured |
|  | 5% Weight Loss Temperature (° C.) | 450 | 445 | 360 | 360 | 390 | 250 |  |
|  | Viscosity Increase Rate (%) 25° C./12 hr | 140 | 130 | 120 | 440 | 140 | 160 | 110 |
|  | Curing Property (150° C./1 hr) | Good | Good | Good | Good | Good | Good | Bad |

TABLE 2

|  |  | Equivalent Weight | Working Example 10 | Working Example 11 | Working Example 12 | Working Example 13 | Working Example 14 |
|---|---|---|---|---|---|---|---|
| Component (A) | Cyanate ester compound (A1) | 133 | 96 | 96 | 96 | 96 | 96 |
|  | (A2) | 119 |  |  |  |  |  |
| Component (B) | Phenol curing agent (B1) | 107 | 4 | 4 | 4 | 4 | 4 |
|  | (B2) | 132 |  |  |  |  |  |
|  | (B3) | 145 |  |  |  |  |  |
|  | (B4) | 107 |  |  |  |  |  |
|  | (B5) | 107 |  |  |  |  |  |

TABLE 2-continued

| | | | | | | | |
|---|---|---|---|---|---|---|---|
| Comparison (B) | (B6) | 141 | | | | | |
| Component (C) | Curing accelerator (C1) | | 1 | 2 | | | |
| | (C2) | | | | 1 | 2 | |
| | (C3) | | | | | | 0.5 |
| | (C4) | | | | | | |
| Comparison (C) | (C5) | | | | | | |
| | (C6) | | | | | | |
| | (C7) | | | | | | |
| | (C8) | | | | | | |
| | (C9) | | | | | | |
| | (C10) | | | | | | |
| | (C11) | | | | | | |
| | Equivalent Weight Ratio (CN group:CH group) | | 20.0 | 20.0 | 20.0 | 20.0 | 20.0 |
| Measurement values | Glass Transition Temperature Tg (° C.) | | 225 | 220 | 225 | 220 | 225 |
| | 5% Weight Loss Temperature (° C.) | | 440 | 440 | 430 | 440 | 440 |
| | Viscosity Increase Rate (%) 25° C./12 hr | | 110 | 130 | 110 | 120 | 110 |
| | Curing Property (150° C./1 hr) | | Good | Good | Good | Good | Good |

| | | Working Example 15 | Working Example 16 | Working Example 17 | Working Example 18 | Working Example 19 | Working Example 20 |
|---|---|---|---|---|---|---|---|
| Component (A) | Cyanate ester compound (A1) | 96 | 96 | 96 | 96 | 97 | 90 |
| | (A2) | | | | | | |
| Component (B) | Phenol curing agent (B1) | 4 | 4 | 4 | 4 | 3 | 10 |
| | (B2) | | | | | | |
| | (B3) | | | | | | |
| | (B4) | | | | | | |
| | (B5) | | | | | | |
| Comparison (B) | (B6) | | | | | | |
| Component (C) | Curing accelerator (C1) | | | | | | |
| | (C2) | | | | | | |
| | (C3) | 1 | 2 | | | 0.5 | 0.5 |
| | (C4) | | | 0.5 | 1 | | |
| Comparison (C) | (C5) | | | | | | |
| | (C6) | | | | | | |
| | (C7) | | | | | | |
| | (C8) | | | | | | |
| | (C9) | | | | | | |
| | (C10) | | | | | | |
| | (C11) | | | | | | |
| | Equivalent Weight Ratio (CN group:CH group) | 20.0 | 20.0 | 20.0 | 20.0 | 30.0 | 7.0 |
| Measurement values | Glass Transition Temperature Tg (° C.) | 225 | 220 | 220 | 215 | 230 | 210 |
| | 5% Weight Loss Temperature (° C.) | 440 | 440 | 440 | 440 | 440 | 440 |
| | Viscosity Increase Rate (%) 25° C./12 hr | 110 | 120 | 120 | 130 | 110 | 140 |
| | Curing Property (150° C./1 hr) | Good | Good | Good | Good | Good | Good |

| | | | Working Example 21 | Working Example 22 | Working Example 23 |
|---|---|---|---|---|---|
| Component (A) | Cyanate ester compound (A1) | | 67 | 48 | |
| | (A2) | | 29 | 48 | 96 |
| Component (B) | Phenol curing agent (B1) | | 4 | 4 | 4 |
| | (B2) | | | | |
| | (B3) | | | | |
| | (B4) | | | | |
| | (B5) | | | | |
| Comparison (B) | (B6) | | | | |
| Component (C) | Curing accelerator (C1) | | | | |
| | (C2) | | | | |
| | (C3) | | 0.5 | 0.5 | 0.5 |
| | (C4) | | | | |

TABLE 2-continued

|  |  |  |  |  |
|---|---|---|---|---|
| Comparison (C) | (C5) |  |  |  |
|  | (C6) |  |  |  |
|  | (C7) |  |  |  |
|  | (C8) |  |  |  |
|  | (C9) |  |  |  |
|  | (C10) |  |  |  |
|  | (C11) |  |  |  |
|  | Equivalent Weight Ratio (CN group:CH group) | 20.0 | 20.0 | 20.0 |
| Measurement values | Glass Transition Temperature Tg (° C.) | 280 | 280 | 290 |
|  | 5% Weight Loss Temperature (° C.) | 445 | 445 | 450 |
|  | Viscosity Increase Rate (%) 25° C./12 hr | 130 | 130 | 150 |
|  | Curing Property (150° C./1 hr) | Good | Good | Good |

TABLE 3

|  |  | Equivalent Weight | Comparative Example 6 | Comparative Example 7 | Comparative Example 8 | Comparative Example 9 | Comparative Example 10 |
|---|---|---|---|---|---|---|---|
| Component (A) | Cyanate ester compound (A1) | 133 | 96 | 96 | 96 | 96 | 96 |
|  | (A2) | 119 |  |  |  |  |  |
| Component (B) | Phenol curing agent (B1) | 107 | 4 | 4 | 4 | 4 | 4 |
|  | (B2) | 132 |  |  |  |  |  |
|  | (B3) | 145 |  |  |  |  |  |
|  | (B4) | 107 |  |  |  |  |  |
|  | (B5) | 107 |  |  |  |  |  |
| Comparison (B) | (B6) | 141 |  |  |  |  |  |
| Component (C) | Curing accelerator (C1) |  |  |  |  |  |  |
|  | (C2) |  |  |  |  |  |  |
|  | (C3) |  |  |  |  |  |  |
|  | (C4) |  |  |  |  |  |  |
| Comparison (C) | (C5) |  | 1 |  |  |  |  |
|  | (C6) |  |  | 1 |  |  |  |
|  | (C7) |  |  |  | 0.1 | 0.5 |  |
|  | (C8) |  |  |  |  |  | 0.5 |
|  | (C9) |  |  |  |  |  |  |
|  | (C10) |  |  |  |  |  |  |
|  | (C11) |  |  |  |  |  |  |
|  | Equivalent Weight Ratio (CN group:CH group) |  | 20.0 | 20.0 | 20.0 | 20.0 | 20.0 |
| Measurement values | Glass Transition Temperature Tg (° C.) |  | 200 | 210 | Gel | Gel | 180 |
|  | 5% Weight Loss Temperature (° C.) |  | 410 | 410 |  |  | 380 |
|  | Viscosity Increase Rate (%) 25° C./12 hr |  | 110 | 240 |  |  | 410 |
|  | Curing Property (150° C./1 hr) |  | Bad | Good |  |  | Good |

|  |  | Comparative Example 11 | Comparative Example 12 | Comparative Example 13 | Comparative Example 14 |
|---|---|---|---|---|---|
| Component (A) | Cyanate ester compound (A1) | 96 | 96 | 96 | 96 |
|  | (A2) |  |  |  |  |
| Component (B) | Phenol curing agent (B1) | 4 | 4 | 4 | 4 |
|  | (B2) |  |  |  |  |
|  | (B3) |  |  |  |  |
|  | (B4) |  |  |  |  |
|  | (B5) |  |  |  |  |
| Comparison (B) | (B6) |  |  |  |  |
| Component (C) | Curing accelerator (C1) |  |  |  |  |
|  | (C2) |  |  |  |  |
|  | (C3) |  |  |  |  |
|  | (C4) |  |  |  |  |

TABLE 3-continued

| | | Comparison (C) | | | |
|---|---|---|---|---|---|
| | (C5) | | | | |
| | (C6) | | | | |
| | (C7) | | | | |
| | (C8) | | | | |
| | (C9) | 0.3 | 0.5 | | |
| | (C10) | | | 1 | |
| | (C11) | | | | 1 |
| | Equivalent Weight Ratio (CN group:CH group) | 20.0 | 20.0 | 20.0 | 20.0 |
| Measurement values | Glass Transition Temperature Tg (° C.) | 190 | 200 | 170 | Uncured |
| | 5% Weight Loss Temperature (° C.) | 390 | 390 | 300 | |
| | Viscosity Increase Rate (%) 25° C./12 hr | 380 | 490 | 230 | 130 |
| | Curing Property (150° C./1 hr) | Good | Good | Bad | Bad |

[Evaluation]

Since the working examples 1 to 23 exhibit over 200° C. glass transition temperature, it is concluded that the working examples 1 to 23 have high glass transition temperature. Further, since the working examples 1 to 23 show not less than 380° C. of 5%-weight-loss temperature, it is concluded that the working examples 1 to 23 deteriorate a few in air under high temperature. Furthermore, it is also concluded that the working examples 1 to 23 achieve both curing property in low temperature and workability at room temperature.

INDUSTRIAL APPLICABILITY

A heat-resistance resin composition of the present invention can be preferably used in the field of power semiconductor for car due to high glass transition temperature, achievement of both curing in low temperature and storage stability, and low deterioration in air under high temperature.

What is claimed is:

1. A heat-curable resin composition comprising:
  (A) a cyanate ester compound having at least two cyanate groups in a molecule,
  (B) a phenol curing agent comprising a resin represented by the following formula (1)

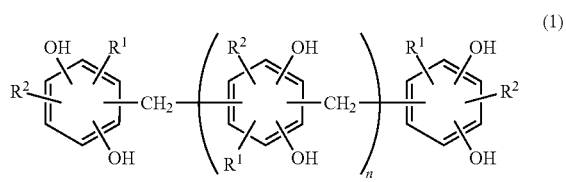
(1)

wherein n represents an integer from 0 to 10, each of $R^1$ and $R^2$ independently represents a hydrogen atom or a monovalent group selected from an alkyl group having 1 to 10 carbon atoms, an allyl group, and a vinyl group, and (C) at least one compound selected from
  a tetraphenylborate of a tetra-substituted phosphonium compound and
  a tetraphenylborate represented by the following formula (2):

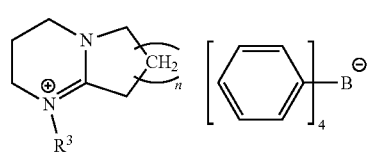
(2)

wherein $R^3$ represents a hydrogen atom, an alkyl group having 1 to 6 carbon atoms, or a phenyl group, and n represents an integer from 1 to 3.

2. The heat-curable resin composition according to claim 1, wherein an amount of the phenol curing agent (B) is an amount at which cyanate groups in the cyanate ester compound (A) are in an amount of 1 to 100 equivalents with respect to an amount of a hydroxyl group (OH group) in the resin represented by the formula (1).

3. The heat-curable resin composition according to claim 1, wherein the cyanate ester compound (A) is in the liquid form at 80° C.

4. The heat-curable resin composition according to claim 1, wherein the component (C) comprises a tetraphenylborate of 1,8-diazabicyclo[5.4.0]undec-7-ene derivative represented by the following formula (3), and a tetraphenylborate of 1,5-diazabicyclo[4.3.0]non-5-ene derivative represented by the following formula (4):

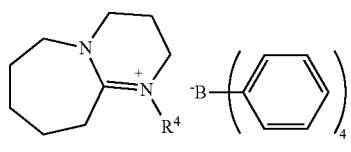
(3)

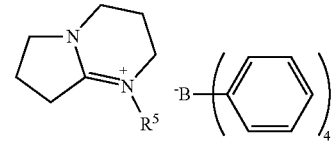
(4)

wherein $R^4$ and $R^5$ represent a hydrogen atom or a monovalent group selected from a saturated hydrocarbon group having 1 to 30 carbon atoms, or an unsaturated hydrocarbon group having 2 to 30 carbon atoms.

* * * * *